March 11, 1958    W. M. HUYCK ET AL    2,826,073
STERILIZATION INDICATOR
Filed Feb. 20, 1956
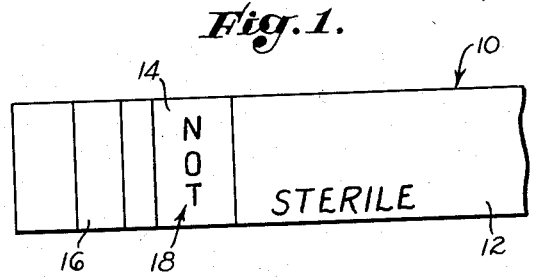
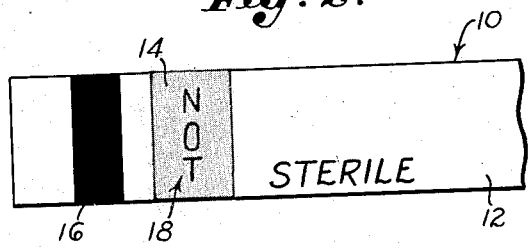
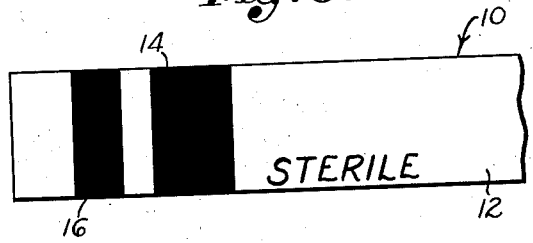
INVENTORS.
WILLARD M. HUYCK
VINCENT A. ROMITO
BY THEIR ATTORNEYS.
HARRIS, KIECH, FOSTER & HARRIS 2,826,073

Patented Mar. 11, 1958

2,826,073

STERILIZATION INDICATOR

Willard M. Huyck, Woodland Hills, and Vincent A. Romito, North Hollywood, Calif., assignors to Aseptic-Thermo Indicator Company, North Hollywood, Calif., a corporation of California Application February 20, 1956, Serial No. 566,705

2 Claims. (Cl. 73—356)

The present invention relates in general to devices for indicating completion of sterilization processes, or other, similar processes, and, more particularly, to indicators which include thermosensitive indicating materials capable of undergoing color changes upon completion of such processes. Still more particularly, the invention relates to an indicator which includes a thermosensitive indicating material capable of changing from one color to another in response to exposure to a predetermined temperature for a predetermined interval of time in an atmosphere of steam, thermosensitive indicating materials of this nature being well known in the art.

Indicators of the foregoing nature are widely used in connection with the autoclave sterilization of surgical and other equipment or materials to indicate completion of the sterilization process, the indicators conventionally being cards or strips of paper, or similar materials, which carry the thermosensitive indicating materials thereon and which are inserted into packs of the equipment or materials to be sterilized. If a particular pack of equipment or material to be sterilized has been autoclaved sufficiently to attain sterilization, i. e., has been exposed to steam at a temperature and for a period of time sufficient to attain sterilization, the thermosensitive indicating material on an indicator inserted into such pack will have changed color to indicate that sterilization is complete. Thermosensitive indicating materials of this nature react to change color in accordance with the following time-temperature equation:

$$t = Be^{K/T}$$

In the foregoing, $t$ is the reaction time, T is the temperature, $e$ is the Napierian logarithmic base, and B and K are constants dependent on the composition of the thermosensitive indicating material. The foregoing equation is substantially identical to the equation which relates time-temperature to the destruction of bacteria so that, with a thermosensitive indicating material which reacts according to the foregoing equation, the color change resulting after a predetermined time-temperature exposure definitely indicates that all bacteria in the vicinity of the indicator have been destroyed to produce an aseptic condition in the pack itno which the indicator has been inserted.

In using a sterilization indicator of the foregoing character, it is important that the color change of the thermosensitive indicating material be carried to completion since, if it is not, incomplete sterilization may result. Consequently, it is necessary, with prior indicators of this nature, that the technician scrutinize the thermosensitive indicating material very carefully to determine whether the color change is complete. Obviously, this requires considerable care and skill and is time consuming and subject to error, all of which are undesirable.

In view of the foregoing, a primary object of the present invention is to provide a sterilization indicator which includes a thermosensitive indicating material and which includes means for indicating in a positive manner that the color change of the thermosensitive indicating material has been carried to completion to indicate completion of the predetermined time-temperature exposure.

More particularly, an important object of the invention is to provide an indicator which includes a thermosensitive indicating material and which includes an indicium indicating a septic, unprocessed condition, such indicium normally being visible, but being invisible, or substantially invisible, upon completion of the color change of the thermosensitive indicating material.

More particularly, an important object of the invention is to provide a sterilization indicator wherein the thermosensitive indicating material and the indicium are in register, and wherein the indicium is of a fixed color which is visible relative to the initial color of the thermosensitive indicating material, but which is substantially invisible relative to the final color thereof.

With the foregoing, the indicium mentioned is rendered substantially invisible by the exposure of the indicator to a predetermined temperature for a predetermined interval of time so as to provide a positive indication that the desired degree of sterilization has been attained, which is an important feature of the invention.

Another object is to provide an indicator wherein an indicium indicating a septic condition, or other unprocessed condition, is superimposed on the thermosensitive indicating material, the indicium being of a color which is visible against the initial color of the thermosensitive indicating material, but which is substantially invisible against the final color thereof. A related object is to provide an indicator wherein the indicium is printed on the thermosensitive indicating material.

While other colors may be used within the scope of the present invention, another object of the invention is to provide a thermosensitive indicating material which changes from white to black upon a predetermined time-temperature exposure, and to provide an indicium which is printed on the initially-white thermosensitive indicating material in black so that, when the thermosensitive indicating material blackens in response to a predetermined time-temperature exposure, the black indicium printed thereon is obscured or rendered substantially invisible. This particular color combination makes evaluation of the color change particularly easy, which is an important feature.

Another object of the invention is to provide an indicator which includes another thermosensitive indicating material capable of changing from one color to another in response to a time-temperature exposure lower than the time-temperature exposure to which the primary sensitive indicating material reacts. Thus, the auxiliary or secondary thermosensitive indicating material changes color first to provide an additional indication of the extent to which the sterilization process has progressed. In other words, if the auxiliary thermosensitive indicating material has changed color, but the indicium in register with the primary thermosensitive indicating material has not been completely obscured, the fact that the sterilization process has not been carried all the way to completion is readily apparent to the technician.

The foregoing objects, advantages, features and results of the present invention, together with other objects, advantages, features and results thereof which will be apparent to those skilled in this art in the light of this disclosure, may be attained with the exemplary embodiment of the invention which is illustrated in the accompanying drawing and which is described in detail hereinafter.

Referring to the drawing:

Fig. 1 is a fragmentary plan view of an indicator which embodies the invention, the condition of the indicator being that obtaining prior to any time-temperature exposure;

Fig. 2 is a fragmentary plan view of the indicator after a partial time-temperature exposure; and Fig. 3 is a fragmentary plan view of the indicator of the invention after completion of the predetermined time-temperature exposure.

In the drawing, the numeral 10 designates an indicator of the invention which includes a base 12 having the form of a narrow strip in the particular construction illustrated, the base being formed of paper or other suitable material. Deposited on the base 12, as by being printed thereon, is a primary thermosensitive indicating material 14 which is capable of changing from an initial color to a final color in response to exposure to a predetermined temperature for a predetermined time interval in an autoclave. Also printed, or otherwise deposited, on the base 12 adjacent the primary thermosensitive indicating material 14 is an auxiliary or secondary thermosensitive indicating material 16 capable of changing from an initial color to a final color in response to a lower time-temperature exposure than the primary thermosensitive indicating material 14. In other words, the secondary thermosensitive material 16 will change color in response to a lower temperature exposure than the primary thermosensitive indicating material 14, or in response to a lower time exposure, or both. In the particular indicator 10 illustrated, the primary and secondary thermosensitive indicating materials 14 and 16 change from white to black in response to their respective predetermined time-temperature exposures, but it will be understood that thermosensitive indicating materials having other initial and final colors may be utilized.

Deposited on the base 12 in register with the primary thermosensitive indicating material 14 is an indicium 18, this indicium being superimposed on the material 14 by being printed thereon. The indicium 18 is printed on the primary thermosensitive material 14 with a material which does not change color in response to the time-temperature exposures to which the materials 14 and 16 are responsive so that the color of the indicium 18 is fixed. The color selected for the indicium 18 is one which is visible against the initial color of the primary thermosensitive indicating material 14, as by being of a contrasting color, but is one which is substantially invisible against the final color of the primary thermosensitive indicating material, as by being the same color. For example, the indicium 18 may be black and the initial and final colors of the primary thermosensitive indicating material 14 may be white and black, respectively, so that the indicium is clearly visible when the primary thermosensitive indicating material 14 is white, but is substantially invisible when this material is black, it being understood that other color combinations may be utilized to achieve the same results. Preferably, the secondary thermosensitive indicating material 16 is one which also changes color from white to black in response to its predetermined time-temperature exposure.

In the particular construction illustrated for the indicator 10, the indicium 18 is constituted by the word "Not." When this word is visible against the primary thermosensitive indicating material 14, it cooperates with the word "Sterile" to form the words "Not sterile," thereby indicating that the equipment or material with which the indicator is being used is septic. However, when the indicium "Not" is obscured, or rendered at least substantially invisible, by the reaction which changes the color of the primary thermosensitive indicating material 14 to its final color only the word "Sterile" appears to indicate that the sterilizing process has been completed, as illustrated in Fig. 3 of the drawing.

Considering the operation of the invention, the appearance of the indicator 10 is as illustrated in Fig. 1 of the drawing prior to any time-temperature exposure. After a temperature-time exposure in an autoclave corresponding to the predetermined temperature-time exposure for the secondary thermosensitive indicating material 16, this material changes from its initial color to its final color, as illustrated in Fig. 2 of the drawing, to indicate that the sterilizing operation has been at least partially completed. However, until such time as the predetermined time-temperature exposure to which the primary thermosensitive indicating material 14 is responsive has been completed, the indicium "Not" remains visible, as illustrated in Fig. 2 of the drawing, to indicate that a septic condition still obtains. Only after the indicator 10 has been exposed to steam at a temperature and for a period of time corresponding to the predetermined time-temperature exposure of the primary thermosensitive indicating material 14 does this material change color completely to obscure, or render at least substantially invisible, the indicium "Not." When the prescribed time-temperature exposure has been attained, the word "Not" disappears and only the word "Sterile" remains, as illustrated in Fig. 3 of the drawings. Thus, the technician is provided with a positive indication that the sterilizing process is either incomplete, or complete, which is an important feature of the present invention.

Although we have disclosed an exemplary embodiment of our invention herein for purposes of illustration, it will be understood that various minor changes, modifications and substitutions may be incorporated in such embodiment without departing from the spirit of the invention as defined by the claims hereinafter appearing.

We claim as our invention:

1. An indicator including a base having thereon a first thermosensitive indicating material capable of changing from one color to another in response to exposure to a first predetermined temperature for a first predetermined interval of time, and having thereon an indicium indicating an unprocessed condition, said first thermosensitive indicating material and said indicium being in register on said base and said indicium being of a color which is visible relative to said one color of said first thermosetting indicating material and which is substantially invisible relative to said other color thereof, whereby said indicium is rendered substantially invisible by said exposure to said first predetermined temperature for said first predetermined interval of time, said base having thereon a second thermosensitive indicating material adjacent said first thermosensitive indicating material, said second thermosensitive indicating material being capable of changing color in response to exposure to a second predetermined temperature for a second predetermined interval of time, one of said second predetermined temperature and said second predetermined interval of time being lower than the corresponding one of said first predetermined temperature and said first predetermined interval of time so that said second thermosensitive indicating material changes color before said first thermosensitive indicating material does.

2. An indicator including a first thermosensitive indicating material capable of changing color in response to a first thermal exposure, and including an indicium which is in register with said first thermosensitive indicating material and which is of a color visible relative to one of the colors of said first thermosensitive indicating material and substantially invisible relative to the other color thereof, said indicator also including a second thermosensitive indicating material which is capable of changing color in response to a second thermal exposure less than said first thermal exposure so that said second thermosensitive indicating material changes color before said first thermosensitive indicating material does.

References Cited in the file of this patent

UNITED STATES PATENTS

| | | |
|---|---|---|
| 2,118,144 | Berman | May 24, 1938 |
| 2,198,162 | Greenwald | Apr. 23, 1940 |
| 2,308,087 | Lappala | Jan. 12, 1943 |
| 2,579,738 | Hargreaves | Dec. 25, 1951 |